(No Model.)  H. H. WABERS.  2 Sheets—Sheet 1.
HAND PLANTER.

No. 566,635. Patented Aug. 25, 1896.

Witnesses
Jos. H. Blackwood
Albert B. Blackwood.

Inventor
Henry H. Wabers
by David A. Gowrick
Attorney (No Model.) 2 Sheets—Sheet 2.
H. H. WABERS.
HAND PLANTER.
No. 566,635. Patented Aug. 25, 1896.
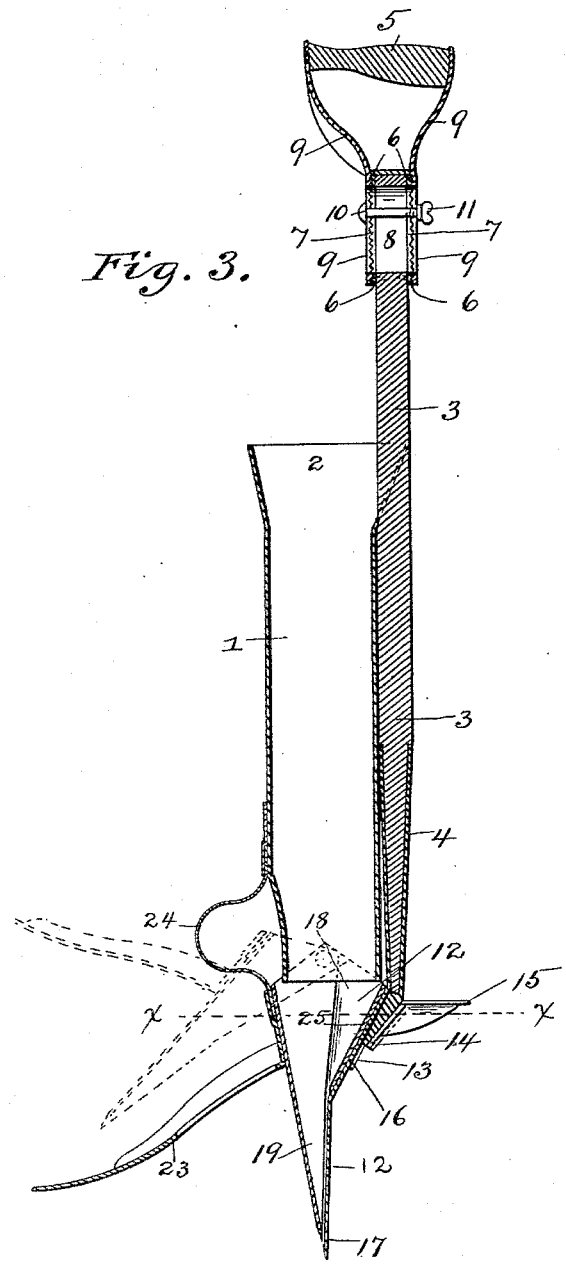
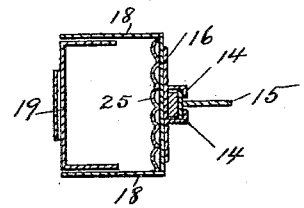
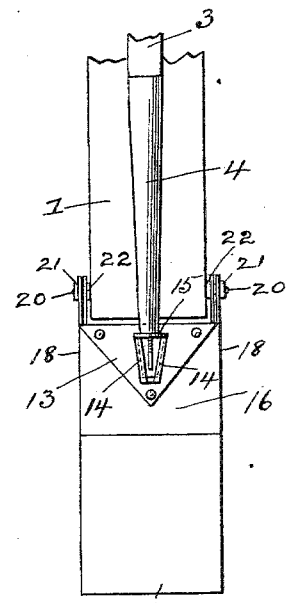
Witnesses
Jos. H. Blackwood
Albert B. Blackwood.
Inventor
Henry H. Wabers
by David A. Gowrick
Attorney

UNITED STATES PATENT OFFICE.

HENRY H. WABERS, OF WAUTOMA, WISCONSIN.

HAND-PLANTER.

SPECIFICATION forming part of Letters Patent No. 566,635, dated August 25, 1896.

Application filed September 7, 1895. Serial No. 561,848. (No model.)

*To all whom it may concern:*

Be it known that I, HENRY H. WABERS, a citizen of the United States, residing at Wautoma, in the county of Waushara and State of Wisconsin, have invented certain new and useful Improvements in Hand-Planters, of which the following is a specification.

My invention relates to that class of devices commonly known as "hand-planters," more particularly those adapted for use in planting potatoes, and has for its object to provide an improved construction over those heretofore in use which will combine in its structure simplicity of action as well as economy in manufacture. This object I accomplish in the manner and by the means hereinafter described and claimed, reference being had to the accompanying drawings, in which—

Figure 1:
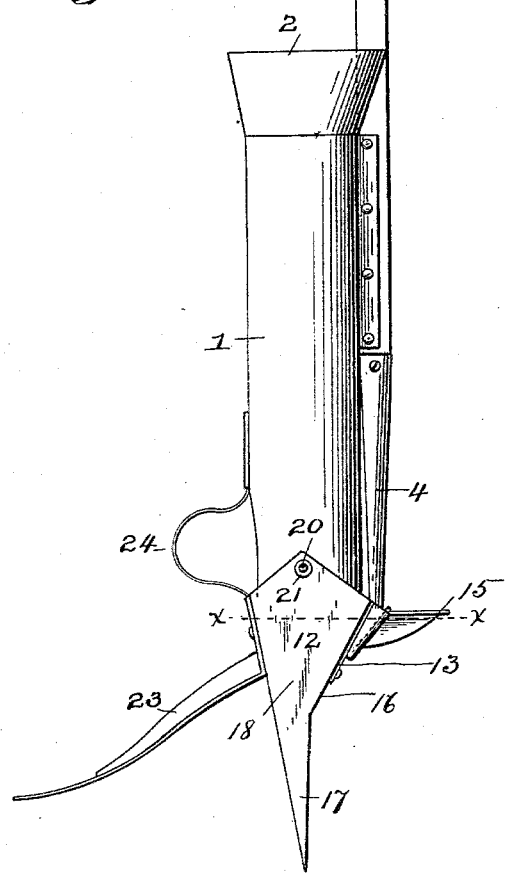
Figure 2:
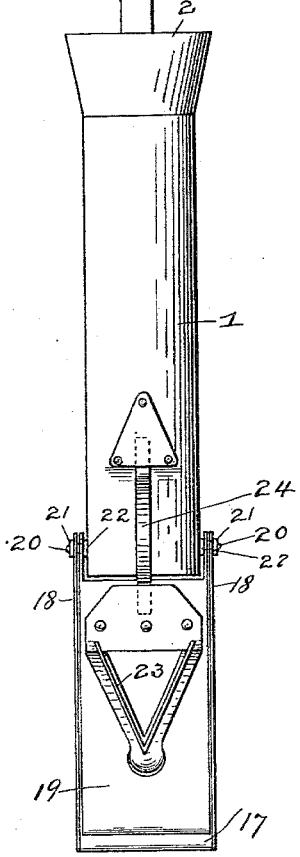

Figure 1 is a side elevation of my improved device. Fig. 2 is a front elevation of the same. Fig. 3 is a vertical longitudinal section. Fig. 4 is a transverse section on the line $x\,x$, Fig. 1. Fig. 5 is a rear view of the fixed jaw, the foot-piece, and the tube connecting the parts to the handle. Fig. 6 is a detail of one of the pivot-pins.

In the said drawings, the numeral 1 denotes the potato or other seed receiving hopper, preferably round in cross area for the major portion of its length and provided with the flaring mouth 2 at its upper end to receive the seed. Attached to the side of said hopper is the handle 3, the two being connected together, preferably, by nailing, screwing, or riveting the free edges of the hopper thereto, as shown. This handle extends a little over half-way down the length of the hopper and is received at its lower end in the tube 4, which forms a means of connection between it and the lower fixed jaw, as hereinafter described. At its upper end a suitable handhold 5 is adjustably connected to said handle in the following manner: Embracing and fastened to two sides of the handle are toothed plates 6, preferably connected together at their top, as shown, and having the longitudinal slots 7 registering with a similar slot 8 in the handle. The arms 9 of the handhold 5 converge at their lower ends and are provided on their inner surfaces with teeth to engage with the teeth on the plates 6. These arms are apertured to receive the through-bolt 10, which also passes through the slots 7 and 8 and forms a means of connection between the several parts. A suitable nut 11 on said bolt is provided to clamp the parts at any desired point of adjustment. It will also be noticed that the rear or under one of the arms 9 of the handhold is somewhat shorter than the upper one to present it to the hand of the operator at a convenient angle.

The tube 4 is firmly connected to the fixed jaw 12 of the planter by means of the triangular plate 13, riveted to said jaw. Lips 14, bent over toward each other and converging slightly toward their lower ends, are fixed to the plate 13 for detachably receiving the foot-piece 15, as shown in Figs. 4 and 5. The fixed jaw 12 thus located at the lower open end of the hopper 1 is shaped as shown in Fig. 1, having the inclined portion 16, upon which the seed falls as it passes through the hopper, and the lower projecting lip 17, adapted to be forced into the ground. Near the upper ends of the sides 18 of said jaw is pivoted the movable jaw 19 by means of the pivot-pins 20. These pins are provided with the outside washers 21, and have enlarged heads 22 abutting against the sides of the hopper 1, as shown in Figs. 2 and 5.

The lower end of the movable jaw 19 terminates slightly above the end of the fixed jaw 12, and has projecting at an angle therefrom near its upper end the bracket 23, suitably connected thereto. A U-shaped spring 24, detachably connected to said jaw 19 and the hopper 1, serves to normally retain the jaw in its closed position.

Suitably attached to the inner inclined portion 16 of the fixed jaw is a corrugated plate 25 for a purpose hereinafter described.

The operation of the device will now be understood to be as follows: The potato or other seed is dropped into the hopper 1 and falls onto the corrugated plate 25. The jaws are then forced into the ground, preferably by hand, or where the ground is hard then by the foot-piece 15 until the bracket 23 by its contact with the ground forces the movable jaw 19 open sufficiently to permit the passage of the seed into the ground. Upon the withdrawal of the jaws the spring 24 automatically closes the same and the device is ready for more seed. When potatoes are being planted, the corrugations of the plate 25 prevent the raw surfaces of the potatoes sticking to the plate.

I have shown and described the hopper 1 as round in cross area; but it may be made square, if desired.

The adjustability of the handhold will permit the ready use of the device by men of different heights.

Having thus described my invention, what I claim as new, and desire to secure by Letters Patent, is—

1. In a hand-planter, the combination with a hopper, a handle attached thereto, and fixed and movable jaws at the lower end of said hopper, of the removable foot-piece 15 attached to the under side of said fixed jaw by the lips 14 secured on the plate 13, substantially as shown and described.

2. In a hand-planter, the combination with a hopper, and fixed and movable jaws at the lower end thereof, of a longitudinally-slotted handle attached to said hopper, toothed plates thereon having slots registering with the slot therein, a handhold, arms running from said handhold and toothed on their inner surfaces to engage with the toothed plates and a bolt and nut for adjustably clamping the said parts together, substantially as shown and described.

3. A hand-planter consisting of the hopper 1, the longitudinally-slotted handle 5, having toothed plates engaging with teeth on the handhold, the fixed jaw 12 at the lower end of the hopper and having the inclined portion 16 carrying the corrugated plate 25, the movable jaw 19 secured to said fixed jaw by the pivot-pins 20 and carrying the bracket 23, the U-shaped spring 24 for retaining said movable jaw normally closed, and the removable foot-piece 15 attached to said fixed jaw, substantially as shown and described.

In testimony whereof I hereto affix my signature in the presence of two witnesses.

HENRY H. WABERS.

Witnesses:
ALBERT BEAN,
J. C. YOUNGLOVE.